(12) United States Patent
Cipra

(10) Patent No.: US 8,696,033 B2
(45) Date of Patent: Apr. 15, 2014

(54) SCISSOR DUCT FLEX JOINT DAMPER

(75) Inventor: Dale O. Cipra, Chatsworth, CA (US)

(73) Assignee: Aerojet Rocketdyne of DE, Inc., Sacramento, CA (US)

( * ) Notice: Subject to any disclaimer, the term of this patent is extended or adjusted under 35 U.S.C. 154(b) by 93 days.

(21) Appl. No.: 13/183,494

(22) Filed: Jul. 15, 2011

(65) Prior Publication Data

US 2013/0015653 A1 Jan. 17, 2013

(51) Int. Cl.
*F16L 27/00* (2006.01)

(52) U.S. Cl.
USPC .................. 285/145.5; 285/227; 285/228

(58) Field of Classification Search
USPC ........ 285/145.5, 227, 228, 226, 147.1, 147.2, 285/147.3, 148.3; 60/232, 257, 204; 239/265.35, 265.19, 265.43, 265.33, 239/265.11; 29/454
See application file for complete search history.

(56) References Cited

U.S. PATENT DOCUMENTS

| | | | | | |
|---|---|---|---|---|---|
| 2,314,776 | A | * | 3/1943 | Dittus et al. ................. | 285/228 |
| 2,545,701 | A | * | 3/1951 | McCausland ................ | 285/228 |
| 2,579,619 | A | * | 12/1951 | Scott ............................ | 285/228 |
| 2,616,255 | A | * | 11/1952 | Altorfer ....................... | 285/228 |
| 2,901,272 | A | * | 8/1959 | Andersen .................... | 285/227 |
| 2,916,307 | A | * | 12/1959 | Peters ......................... | 285/228 |
| 2,960,354 | A | * | 11/1960 | Addie et al. ................. | 285/228 |
| 3,140,584 | A | * | 7/1964 | Ritchey et al. .............. | 60/232 |
| 3,184,917 | A | * | 5/1965 | Caouette et al. ............ | 60/232 |
| 3,251,553 | A | * | 5/1966 | Fitton et al. ............ | 239/265.35 |
| 3,361,362 | A | | 1/1968 | Edwards | |
| 3,369,829 | A | * | 2/1968 | Hopkins ...................... | 285/227 |
| 3,390,899 | A | * | 7/1968 | Herbert et al. .......... | 239/265.35 |
| 3,430,645 | A | * | 3/1969 | Stalph ......................... | 285/226 |
| 3,659,879 | A | * | 5/1972 | Stalph ......................... | 285/227 |
| 3,759,447 | A | * | 9/1973 | Weigmann .............. | 239/265.35 |
| 3,811,713 | A | * | 5/1974 | Barrett et al. ................ | 285/226 |
| 3,860,134 | A | * | 1/1975 | Kobalter ................. | 239/265.43 |
| 3,875,806 | A | * | 4/1975 | Brewster ...................... | 285/226 |
| 4,192,143 | A | * | 3/1980 | Haegele ....................... | 285/226 |
| 4,295,667 | A | * | 10/1981 | Zahs et al. ................... | 285/226 |
| 4,593,941 | A | * | 6/1986 | Whightsil, Sr. .............. | 285/223 |
| 4,659,117 | A | | 4/1987 | Holzhausen et al. | |
| 5,011,194 | A | * | 4/1991 | Nitta ............................ | 285/227 |
| 5,248,170 | A | * | 9/1993 | Francis ........................ | 285/227 |
| 5,299,840 | A | * | 4/1994 | Heye ............................ | 285/227 |
| 5,318,329 | A | * | 6/1994 | Suzuki et al. ................ | 285/227 |
| 5,358,287 | A | * | 10/1994 | Winzen ........................ | 285/227 |
| 5,506,376 | A | * | 4/1996 | Godel .......................... | 285/227 |
| 5,511,828 | A | | 4/1996 | Kurek et al. | |
| 5,601,316 | A | * | 2/1997 | Totino et al. ................ | 285/226 |
| 6,282,887 | B1 | * | 9/2001 | Polushin et al. ............. | 285/226 |
| 7,284,771 | B2 | * | 10/2007 | Baumann et al. ............ | 285/226 |
| 7,562,908 | B2 | * | 7/2009 | Nuccitelli .................... | 285/226 |
| 7,604,259 | B2 | | 10/2009 | Cipra | |
| 8,281,599 | B2 | * | 10/2012 | Even et al. .............. | 239/265.19 |

FOREIGN PATENT DOCUMENTS

| | | |
|---|---|---|
| EP | 1669569 | 6/2006 |
| EP | 2138698 | 12/2009 |

OTHER PUBLICATIONS

European Search Report for European Application No. 12175283.6 dated Nov. 19, 2012.

* cited by examiner

*Primary Examiner* — David E Bochna

(74) *Attorney, Agent, or Firm* — Carlson, Gaskey & Olds P.C.

(57) ABSTRACT

A flex joint assembly includes a damper mounted to a first scissors linkage and a second scissors linkage.

17 Claims, 5 Drawing Sheets

SCISSOR DUCT FLEX JOINT DAMPER

BACKGROUND

The present disclosure relates to an articulated scissor duct, and more particularly to a damped scissors duct.

In some launch vehicles, in flight trajectory control is provided through steerable rocket engines. Such steerability may be achieved by interconnecting actuators to a gimbaled rocket engine. To accommodate such steerability, propellant lines may utilize flexible interconnects often known as flex joints. Such flex joints may include multiple bellows fabricated from stainless steel which can be stretched, compressed or angulated to provide the steerability required Flex joints may be subject to unstable flow regimes in which fluids that flow along internal convolutions of the flex joint bellows may produce flow disturbances. One type of flow disturbance is flow induced vortex shedding. Flow induced vortex shedding is an unsteady flow that may occur at certain fluid flow velocities. The flow disturbances and structural response may result in feedback which may cause large displacements of the bellows convolutions and high cycle fatigue.

Usually, attempts are made to confine the flow velocity to regimes that do not have the potential to excite the bellow convolutions, but this may be difficult in systems with a highly throttleable flow.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
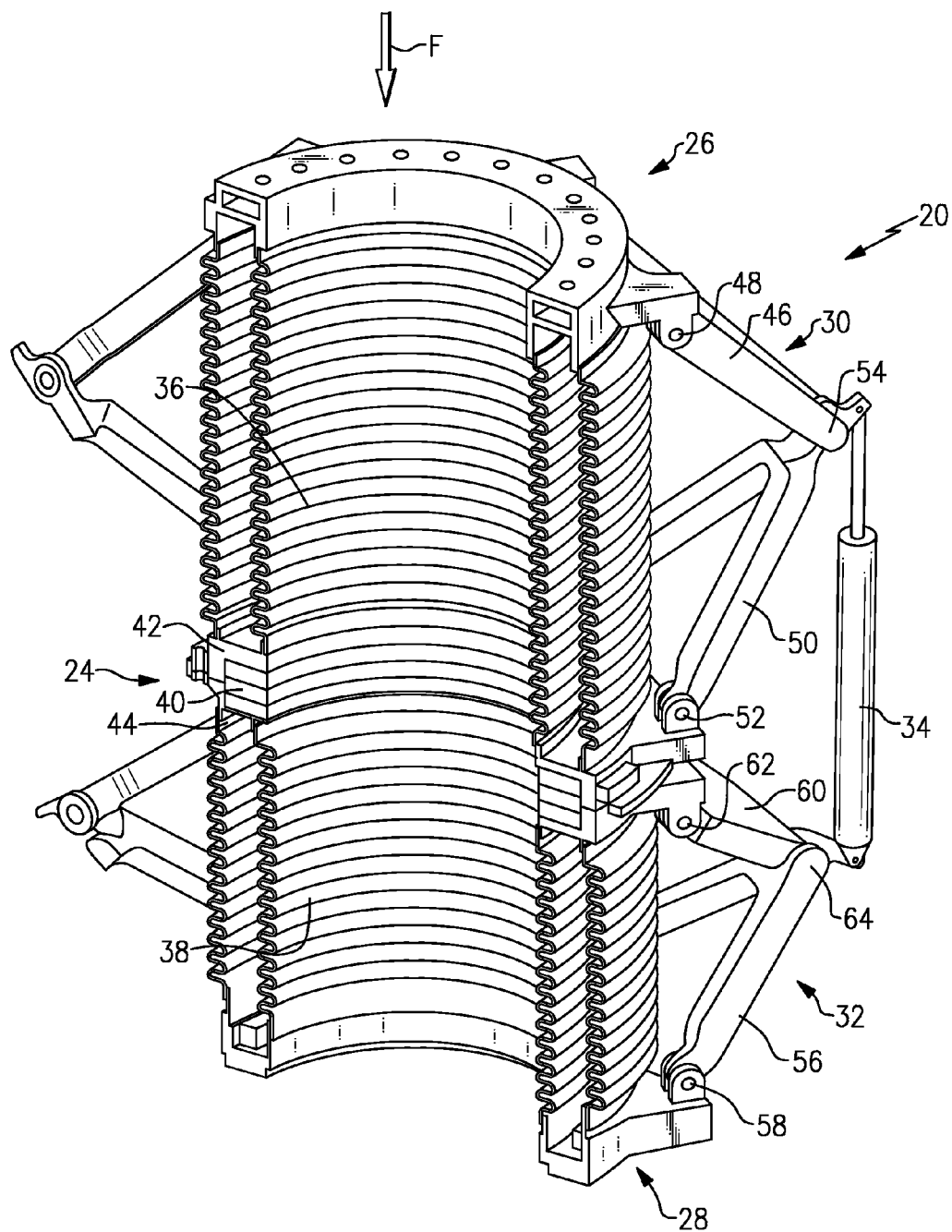
FIG. 1 is a schematic cross-section of a flex joint assembly.
Figure 2:
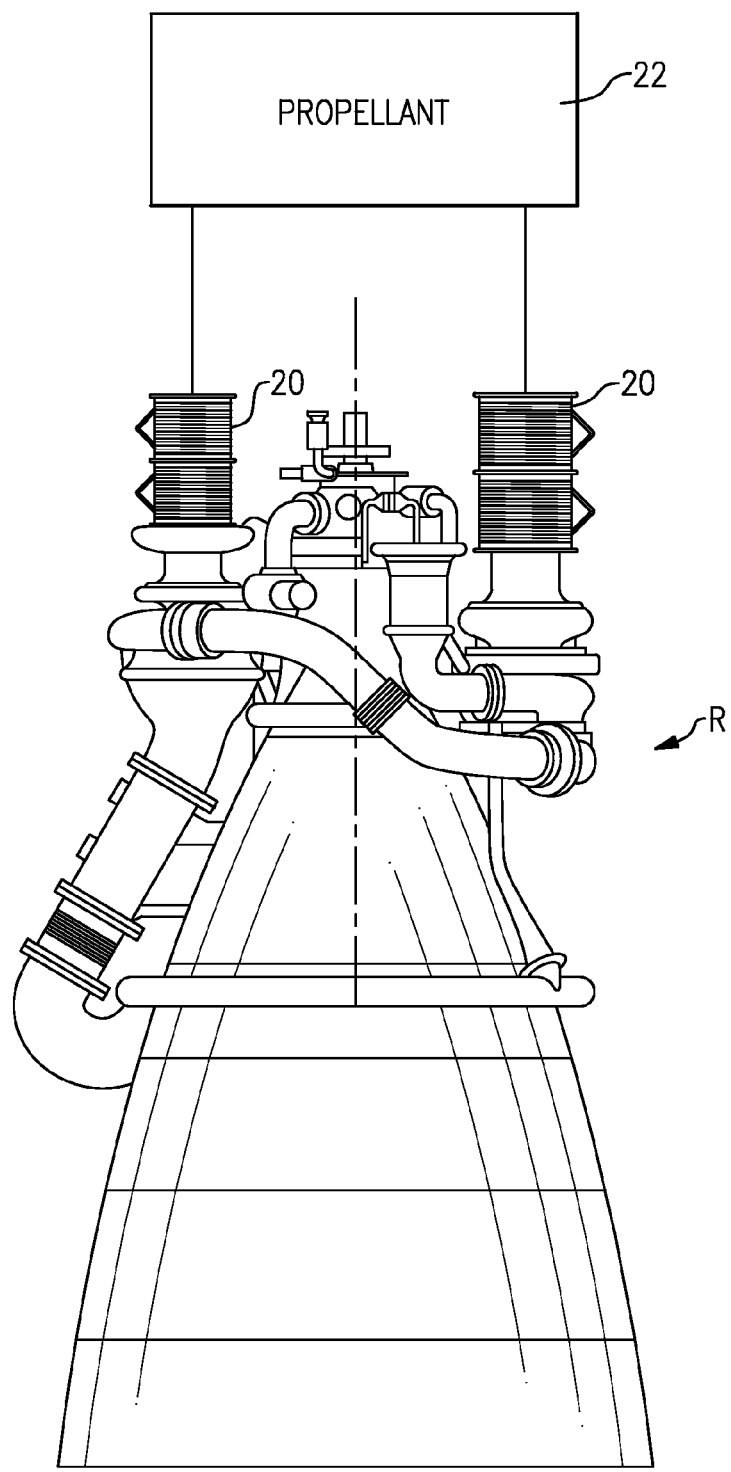
FIG. 2 is a schematic view of a rocket engine with multiple flex joint assemblies.

FIG. 1 schematically illustrates a flex joint assembly 20 often located within a flow line 22 typical of a pipe or duct system which communicates a fluid flow F. The flex joint assembly 20 withstands significant axial stroke such as typical in a gimbaled rocket engine R (FIG. 2). It should be understood that the flex joint assembly 20 may be utilized in various fluid communication systems and is not limited to rocket engines.

The flex joint assembly 20 generally includes a center ring assembly 24, a first ring 26, a second ring 28, a first stabilizer linkage 30, a second stabilizer linkage 32 and a damper 34 between the stabilizer linkages 30, 32. A first bellows 36 is located between the center ring assembly 24 and the first ring 26 and a second bellows 38 is located between the center ring assembly 24 and the second ring 28 to accommodate expansion, compression and angular movement. The center ring assembly 24 and stabilizing linkages 30, 32 provide resistance to bellow system buckling or "squirm". A torsional bellows 40 may be located between a first center ring 42 and a second center ring 44 of the center ring assembly 24 to accommodate torsional flexibility.

The stabilizer linkage 30 generally include a first arm 46 pivotally attached to the first ring 26 at a pivot 48 and a second arm 50 pivotally attached to the first center ring 42 at a pivot 52. The first arm 46 is pivotally attached to the second arm 50 at a pivot 54. The stabilizer linkage 32 likewise generally includes a first arm 56 pivotally attached to the second ring 28 at a pivot 58 and a second arm 60 pivotally attached to the second center ring 44 at a pivot 62. The first arm 56 is pivotally attached to the second arm 60 at a pivot 64. It should be understood that multiple stabilizer linkages 30, 32 may be circumferentially located about the respective bellows 36, 38 to provide the desired control.

Figure 3:
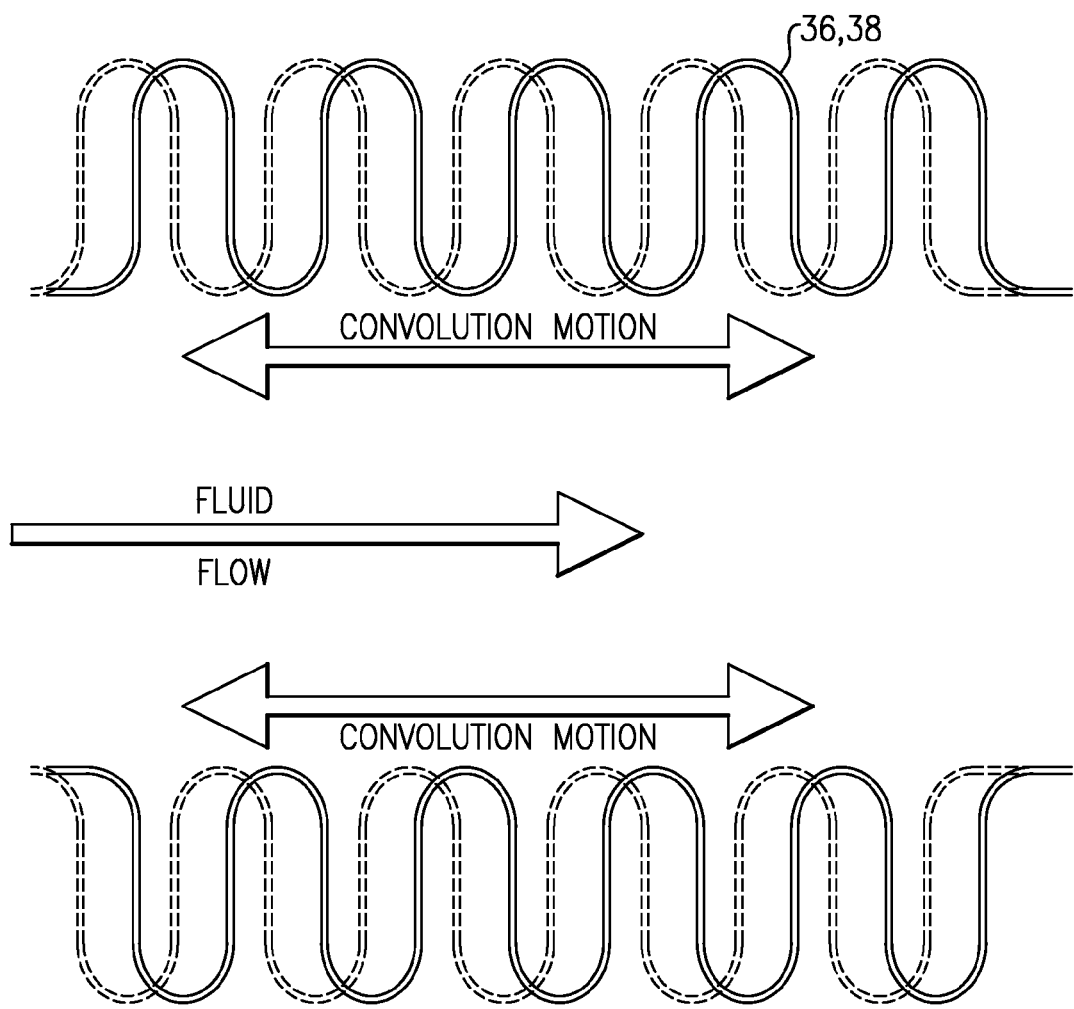
FIG. 3 is a schematic view of flex joint assembly bellows convolution motion due to vortex shedding.
Figure 4:
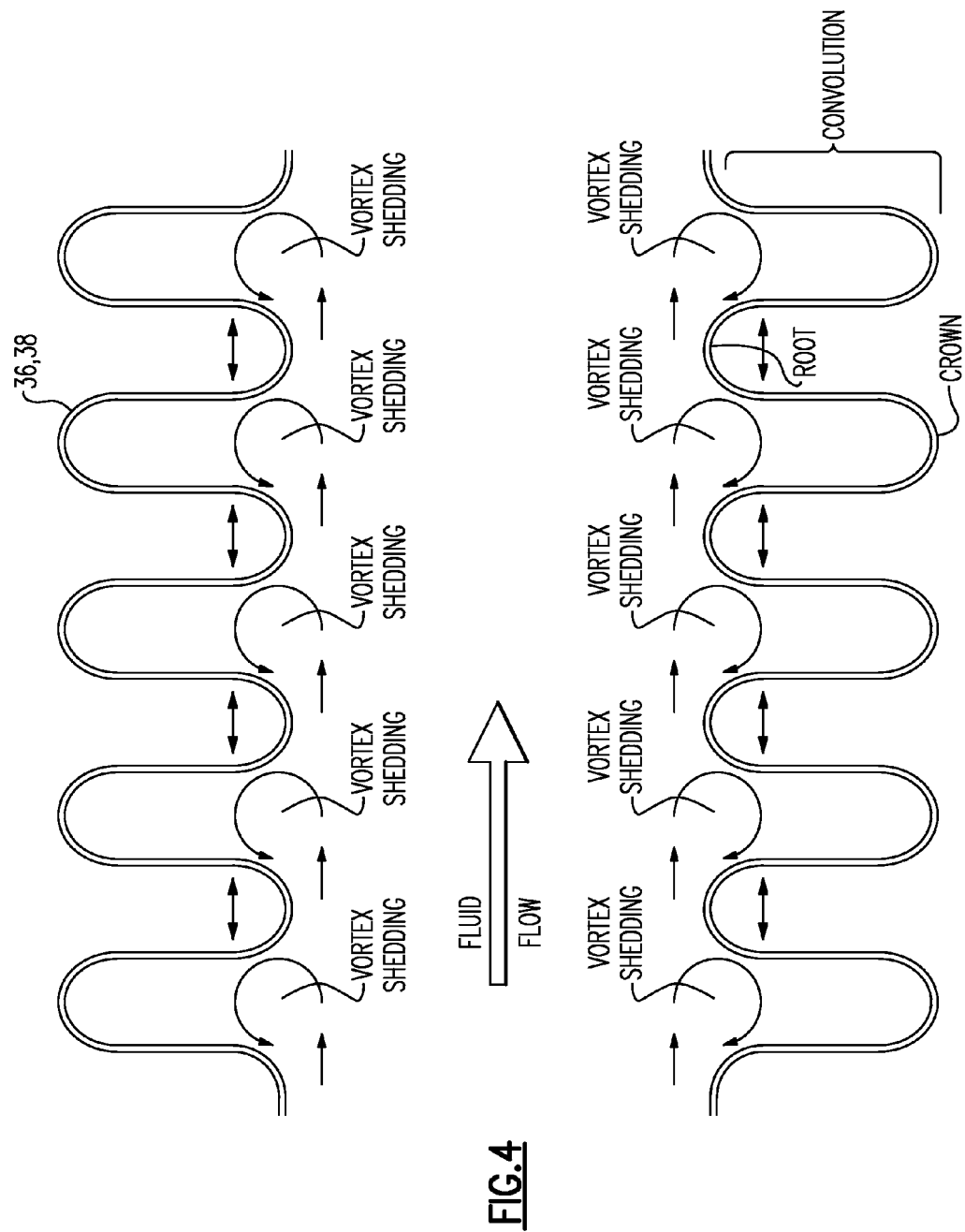
FIG. 4 is a schematic view of a fluid structure within a flex joint assembly bellows.
Figure 5:
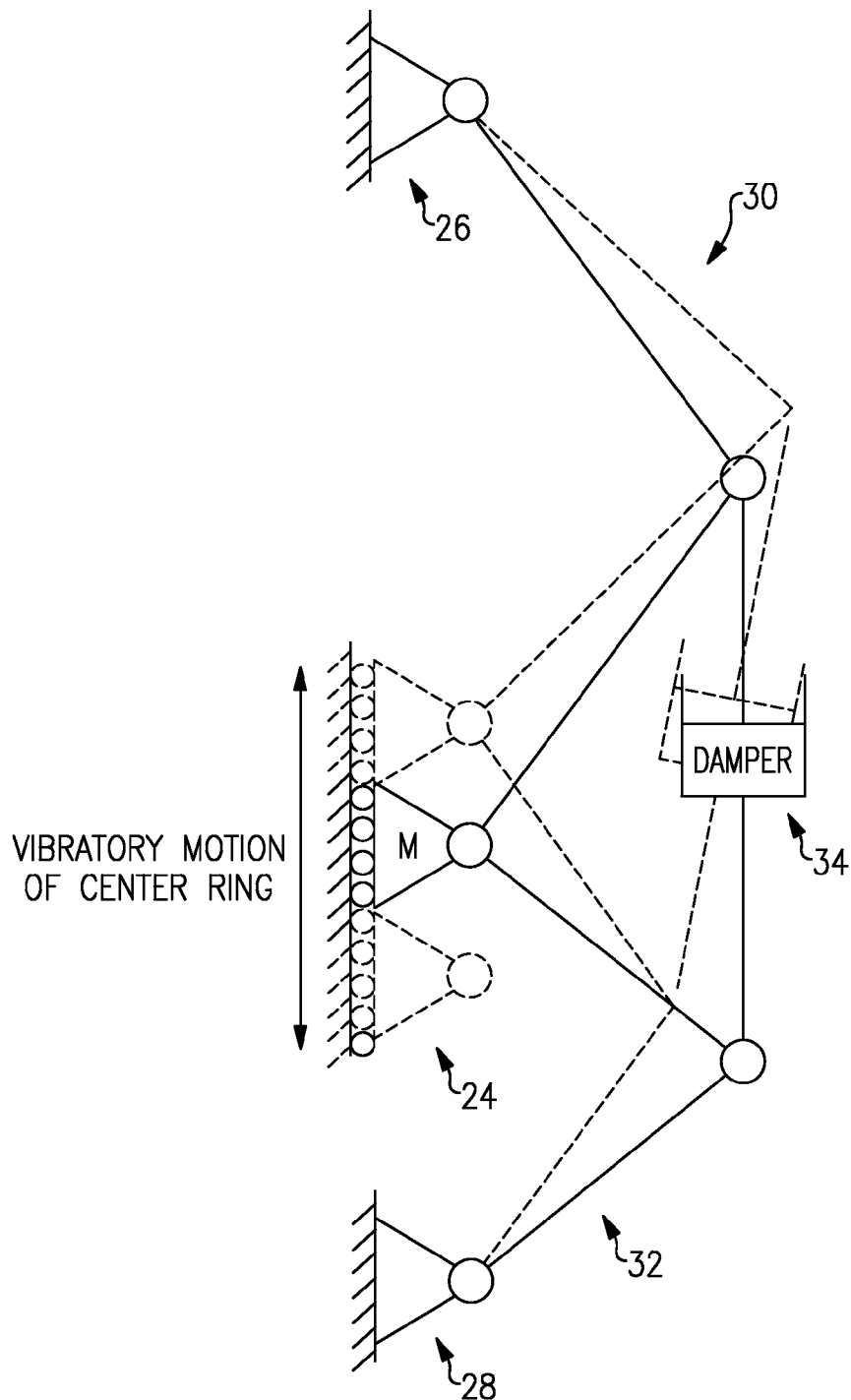
FIG. 5 is a schematic view of a flex joint assembly center ring assembly and damper motion.

The stabilizing linkages 30, 32 advantageously provide a location to attach the damper 34 such as a hydraulic or mechanical damper. In the event of a flow instability (FIGS. 3 and 4) in which the center ring assembly 24 starts to respond to the flow due to bellows interacting with the fluid flow, the motion of the center ring assembly 24 (FIG. 5) will create motion in the dampers 34 and dissipate energy to maintain the convolution displacements of the bellows 36, 38 under control. Each stroke of the damper 34 dissipates energy imparted into the system by the fluid interacting with the convolutions of the bellows 36, 38 to significantly reduce the motion of the center ring assembly 24.

The flex joint assembly 20 effectively damps vibration due to flow induced vibration of the fluid interacting with the bellows convolutions. The flex joint assembly 20 will also damp out center ring assembly 24 dynamic response due to engine or vehicle induced random, sinusoidal, or shock induced vibration. The load acting on the damper is a dynamic vibratory relative motion across the two linkages. This vibratory load may be provided by the motion of an automobile, train, bridge, airplane, vessel, building structure, gas pipeline, etc.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A flex joint assembly comprising:
   a first linkage connected to a first end and an opposing, second end of a first damper;
   a second linkage connected to a first end and an opposing, second end of a second damper; and a third damper mounted to said first linkage and said second linkage, wherein said third damper is a hydraulic damper.

2. The flex joint assembly as recited in claim 1, wherein said first linkage is pivotally attached to a first ring and a center ring assembly.

3. The flex joint assembly as recited in claim 2, wherein said second linkage is pivotally attached to a second ring and said center ring assembly.

4. The flex joint assembly as recited in claim 3, wherein said first damper comprises a first bellows between said first ring and said center ring assembly.

5. The flex joint assembly as recited in claim 4, wherein said second damper comprises a second bellows between said second ring and said center ring assembly.

6. The flex joint assembly as recited in claim 5, wherein said first and second bellows each include a radially inner wall and a radially outer wall spaced from said radially inner wall.

7. The flex joint assembly as recited in claim 5, wherein said center ring assembly is positioned between said first ring and said second ring relative to a direction of flow along the flow line.

8. The flex joint assembly as recited in claim 2, further comprising a torsional bellows between a first center ring and a second center ring of said center ring assembly.

9. The flex joint assembly as recited in claim 1, wherein said third damper is a mechanical damper.

10. The flex joint assembly as recited in claim 1, wherein said third damper is defined generally parallel to an axis of said flex joint assembly.

11. The flex joint assembly as recited in claim 1, wherein said third damper is radially outside a flow line provided by the first and second damper.

12. A flex joint assembly comprising:
a first ring;
a center ring assembly;
a second ring, said center ring assembly positioned between said first ring and said second ring;
a first linkage pivotally attached to said first ring and said center ring assembly;
a second linkage pivotally attached to said second ring and said center ring assembly; and
a damper mounted to said first linkage and said second linkage, wherein said damper is a hydraulic damper.

13. The flex joint assembly as recited in claim 12, wherein said damper is a mechanical damper.

14. The flex joint assembly as recited in claim 12, further comprising a first bellows between said first ring and said center ring assembly.

15. The flex joint assembly as recited in claim 14, further comprising a second bellows between said second ring and said center ring assembly.

16. The flex joint assembly as recited in claim 15, further comprising a torsional bellows between a first center ring and a second center ring of said center ring assembly.

17. A method of damping a flex joint comprising:
damping a first linkage and a second linkage using a common damper, the first linkage connecting opposite ends of a first bellows, the second linkage connecting opposite ends of a second bellows, wherein the damping comprises hydraulically damping.

* * * * *